(12) United States Patent
Ido et al.

(10) Patent No.: US 7,392,322 B2
(45) Date of Patent: Jun. 24, 2008

(54) DATA RECEPTION DEVICE AND DATA DISTRIBUTION SYSTEM

(75) Inventors: Daiji Ido, Yokohama (JP); Carsten Burmeister, Wiesenstrasse (DE); Jose Luis Rey, Heidenreichstrasse (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 866 days.

(21) Appl. No.: 10/490,338

(22) PCT Filed: Apr. 1, 2003

(86) PCT No.: PCT/JP03/04157

§ 371 (c)(1),
(2), (4) Date: Mar. 22, 2004

(87) PCT Pub. No.: WO03/090427

PCT Pub. Date: Oct. 30, 2003

(65) Prior Publication Data

US 2004/0242204 A1 Dec. 2, 2004

(30) Foreign Application Priority Data

Apr. 19, 2002 (JP) ............................. 2002-117659

(51) Int. Cl.
*G06F 15/16* (2006.01)
(52) U.S. Cl. .......................... 709/233; 709/235
(58) Field of Classification Search .................. 709/224, 709/233–235
See application file for complete search history.

(56) References Cited

U.S. PATENT DOCUMENTS 6,185,736 B1 2/2001 Ueno

| | | | |
|---|---|---|---|
| 6,675,211 B1 * | 1/2004 | Mamaghani et al. | 709/224 |
| 6,757,248 B1 * | 6/2004 | Li et al. | 370/235 |
| 7,006,464 B1 * | 2/2006 | Gopalakrishnan et al. | 370/328 |
| 7,079,856 B2 * | 7/2006 | Khan | 455/517 |
| 7,237,007 B2 * | 6/2007 | Kamath et al. | 709/206 |

FOREIGN PATENT DOCUMENTS

| | | |
|---|---|---|
| JP | 09298734 | 11/1997 |
| JP | 11205408 | 7/1999 |
| JP | 2000 172599 | 6/2000 |
| JP | 2000 228669 | 8/2000 |
| WO | 0189257 | 11/2001 |
| WO | 0193500 | 12/2001 |

* cited by examiner

*Primary Examiner*—Larry D Donaghue
(74) *Attorney, Agent, or Firm*—Dickinson Wright, PLLC

(57) ABSTRACT

The radio control section 205 notifies a transmission rate that can be currently set up out of the radio channel transmission rates to the transmission rate decision section 207. The buffer monitoring section 208 monitors an amount of media data stored in the media reception buffer 209 and when the amount of media data stored exceeds a threshold, the buffer monitoring section 208 notifies it to the transmission rate decision section 207. When information on the radio channel transmission rate from the radio control section 205 shows that the radio channel transmission rate is well within the capacity and when monitoring information from the buffer monitoring section 208 shows that the amount of data stored in the media reception buffer 209 does not exceed a threshold, the transmission rate decision section 207 outputs a request for increasing the transmission rate of the media data to the control signal transmission/reception section 206. Thus, even if the maximum rate of the radio channel transmission rate that can be set up decreases due to deterioration of a communication environment, it is possible to prevent data play back from being interrupted.

9 Claims, 6 Drawing Sheets

| STEP | RTSP MESSAGE |
|---|---|
| ST311 | PAUSE rtsp://mediaserver.com/movie.test RTSP/1.0<br>CSeq:31<br>Session:dfhyrio90llk |
| ST312 | RTSP/1.0 200 OK<br>CSeq:31<br>Session:dfhyrio90llk |
| ST313 | PLAY rtsp://mediaserver.com/movie.test RTSP/1.0<br>CSeq:32<br>Session:dfhyrio90llk<br>Speed:3.0 |
| ST314 | RTSP/1.0 200 OK<br>CSeq:32<br>Session:dfhyrio90llk |
| ST318 | PAUSE rtsp://mediaserver.com/movie.test RTSP/1.0<br>CSeq:32<br>Session:dfhyrio90llk |
| ST319 | RTSP/1.0 200 OK<br>CSeq:33<br>Session:dfhyrio90llk |
| ST320 | PLAY rtsp://mediaserver.com/movie.test RTSP/1.0<br>CSeq:33<br>Session:dfhyrio90llk<br>Speed:1.0 |
| ST321 | RTSP/1.0 200 OK<br>CSeq:33<br>Session:dfhyrio90llk |

FIG.4

DATA RECEPTION DEVICE AND DATA DISTRIBUTION SYSTEM

TECHNICAL FIELD

The present invention relates to a data reception apparatus and data distribution system that receives data from a server and plays back the data.

BACKGROUND ART

Conventionally, there is a technology called "streaming" for distributing images like moving images and packet data like speech from a media server on the Internet and receiving and playing back the data at a mobile station apparatus. According to this streaming technology, through a radio network connected to the Internet and a base station apparatus connected to the radio network, data such as moving images distributed from a media server is received by a mobile station apparatus from the base station apparatus and the moving images, etc., are played back. The mobile station apparatus that has received packet data such as moving images plays back the data such as the moving images received from the media server.

In such a streaming technology, a phenomenon called "jitter" occurs in which a delay in data reception increases or decreases according to the network condition. When a delay occurs in data reception due to jitter, the data reception rate becomes lower than the data play back rate. In this case, if the received data is continued to be played back, it comes to a point at which there is no more data to be played back and the play back is no longer possible, and therefore the mobile station apparatus is provided with a buffer, the received data is temporarily stored in this buffer, the data is read from the buffer and played back. In this way, even if some delay occurs in received data, the data stored in the buffer is played back and it is thereby possible to prevent play back of data from being stopped due to the delay of the received data. When play back of data is started for the first time, an operation called "buffering" is performed first whereby a predetermined amount of data is stored in the buffer before the data is played back and the received data is stored in the buffer even after play back of data is started and the data to be played back is read from the buffer and played back. The rate at which data is stored in the buffer needs to be set equal to or higher than the rate at which data is read from the buffer to prevent data to be played back from running short during play back.

However, a conventional radio apparatus has a problem that due to deterioration of a communication environment, a maximum transmission rate that can be set up for a communication channel decreases, the data reception rate falls below the rate at which data is read from the buffer making it impossible to play back the data.

DISCLOSURE OF INVENTION

It is an object of the present invention to provide a data reception apparatus and data distribution system capable of preventing play back of data from being stopped even when a maximum transmission rate that can be set up for a communication channel decreases due to deterioration of a communication environment.

This object can be attained, when a maximum transmission rate of the radio channel transmission rate that can be set up is higher than the rate at which media data is read from a buffer, by requesting the server to send the media data at a high rate and storing more data in the buffer when there is enough space for storage.

BRIEF DESCRIPTION OF DRAWINGS

FIG. 4 illustrates RTSP messages used in steps according to the embodiment of the present invention;

BEST MODE FOR CARRYING OUT THE INVENTION

Embodiment

Figure 1:
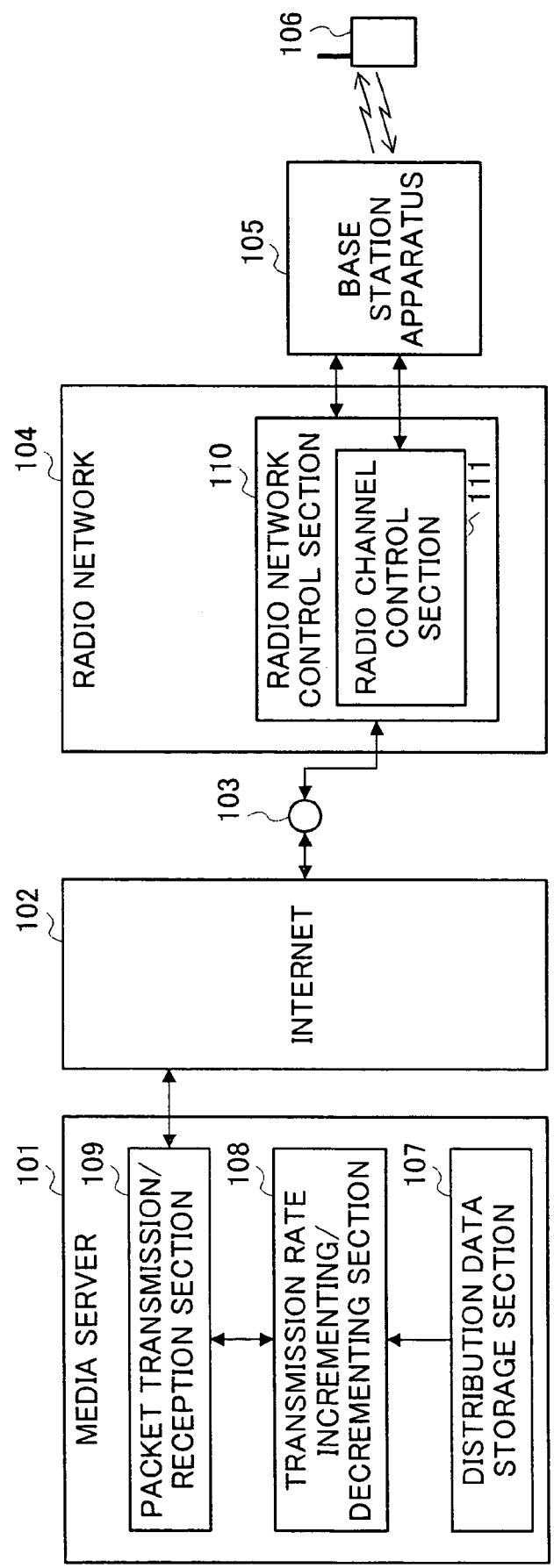
FIG. 1 illustrates an outline of a streaming technology according to an embodiment of the present invention.

With reference now to the attached drawings, embodiments of the present invention will be explained in detail below. FIG. 1 illustrates an outline of a streaming technology. First, an overview of the streaming technology will be explained. A media server 101 which is the means for distributing data is principally constructed of a distribution data storage section 107, a transmission rate incrementing/decrementing section 108 and a packet transmission/reception section 109. The distribution data storage section 107 stores media to be distributed and outputs the media to the transmission rate incrementing/decrementing section 108 when a transmission request arrives from a mobile station apparatus. The transmission rate incrementing/decrementing section 108 controls the transmission rate for the data of the media to be distributed input from the distribution data storage section 107 in such a way that it becomes equal to the transmission rate requested from the mobile station apparatus 106 and outputs the controlled transmission rate to the packet transmission/reception section 109. The packet transmission/reception section 109 transmits/receives packets to/from the mobile station apparatus 106, receives control commands such as distribution request data from the mobile station apparatus 106 from the Internet 102, packetizes the distribution data whose transmission rate is controlled by the transmission rate incrementing/decrementing section 108 and sends the packet data to the mobile station apparatus 106 through the Internet 102.

The Internet 102 outputs the distribution data from the packet transmission/reception section 109 to the radio network 104 through a gateway 103 and outputs the control command from the radio network 104 received through the gateway 103 to the packet transmission/reception section 109. The radio network 104 includes a radio network control section 110 and the radio network control section 110 includes a radio channel control section 111.

The radio network control section 110 which is the notification means outputs the distribution data output from the Internet 102 to the base station apparatus 105. When the radio channel control section 111 receives a media distribution request from the mobile station apparatus 106 from the base station apparatus 105, it sets up a radio channel for the mobile station apparatus 106, adjusts a radio channel transmission rate according to the radio situation and outputs the result to the base station apparatus 105.

The base station apparatus 105 which is the transmission means receives the distribution data output from the radio network control section 110 and the result of the radio channel transmission rate output from the radio channel control section 111, combines the distribution data and the result of adjustment of the radio channel transmission rate, converts it to a radio signal and then sends the radio signal to the mobile station apparatus 106. On the other hand, the base station apparatus 105 receives a control command for a distribution request from the mobile station apparatus 106 and outputs it to the radio network control section 110 and outputs the information that the distribution request has been received to the radio channel control section 111. The mobile station apparatus 106 receives the distribution data of the media sent by radio from the base station apparatus 105 and the result of adjustment of the radio channel transmission rate and sends the transmission request for the media distribution data to the base station apparatus 105 through a radio signal.

Figure 2:
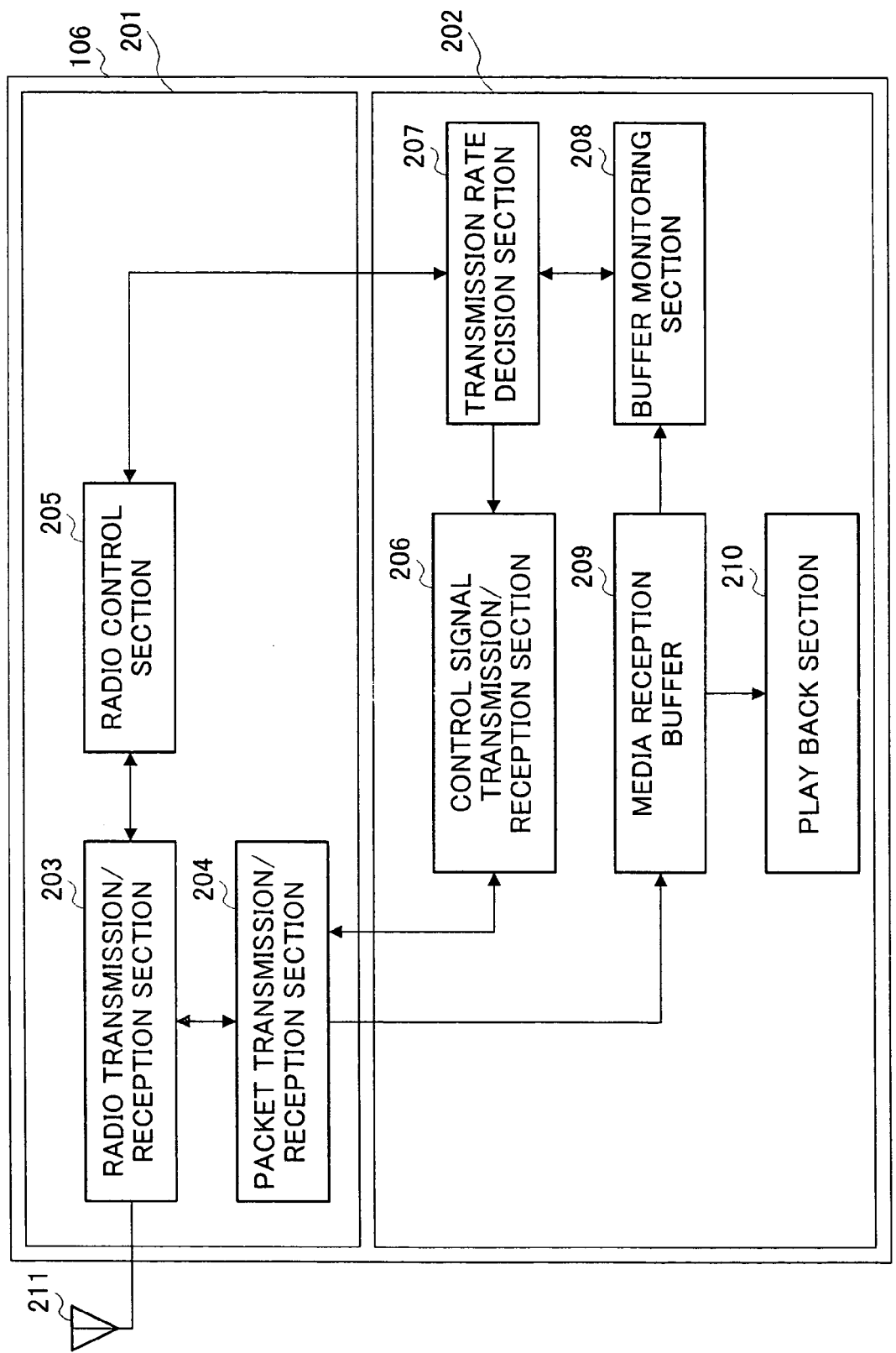
FIG. 2 is a block diagram showing a configuration of a mobile station apparatus according to the embodiment of the present invention.

Then, the configuration of the mobile station apparatus 106 will be explained using FIG. 2. FIG. 2 shows the configuration of the mobile station apparatus 106. The mobile station apparatus 106 is constructed of a radio transmission section 201 and an application section 202. The radio transmission section 201 is principally constructed of an antenna 211, a radio transmission/reception section 203, a packet transmission/reception section 204 and a radio control section 205. The application section 202 is principally constructed of a control signal transmission/reception section 206, a transmission rate decision section 207, a buffer monitoring section 208, a media reception buffer 209 and a play back section 210.

First, the configuration of the radio transmission section 201 will be explained. The radio transmission/reception section 203 which is the data reception means applies radio processing to packet data received through the antenna 211 and outputs the packet data to the packet transmission/reception section 204 and sends packet data input from the packet transmission/reception section 204 from the antenna 211 to the base station apparatus 105 by radio. Furthermore, the radio transmission/reception section 203 sends a signal requesting a setup of a packet communication channel to be used for distribution of the media input from the radio control section 205 and outputs the transmission rate of the packet communication channel set up and sent from the radio network control section 110 to the radio control section 205.

The packet transmission/reception section 204 outputs an application control signal out of the received packet data input from the radio transmission/reception section 203 to the control signal transmission/reception section 206, and outputs the media data such as an image signal to the media reception buffer 209. Furthermore, the packet transmission/reception section 204 receives a signal of a buffering time and buffering speed input from the control signal transmission/reception section 206 and outputs this signal of the buffering time and buffering speed to the radio transmission/reception section 203.

The radio control section 205 which is the monitoring means monitors a variation in the radio channel transmission rate and outputs the transmission rate of a packet communication channel set up for the radio network control section 110 input from the radio transmission/reception section 203 to the transmission rate decision section 207.

Then, the configuration of the application section 202 will be explained. The control signal transmission/reception section 206 controls the application section 202 according to the control signal of the application input from the packet transmission/reception section 204. Furthermore, the control signal transmission/reception section 206 outputs a transmission rate change request control command input from the transmission rate decision section 207 to the packet transmission/reception section 204.

The transmission rate decision section 207 which is the requesting means decides whether or not to request the media server to change the transmission rate using radio channel transmission rate information input from the radio control section 205 and data amount information stored in the media reception buffer 209 input from the buffer monitoring section 208. That is, when the radio channel transmission rate is higher than the rate at which the media data is read from the media reception buffer 209 and the amount of media data stored in the media reception buffer 209 does not exceed a threshold, the transmission rate decision section 207 outputs a media data transmission rate change request control command to the control signal transmission/reception section 206 and when the radio channel transmission rate is lower than the rate at which the media data is read from the media reception buffer 209 or the amount of media data stored in the media reception buffer 209 is equal to or higher than the threshold, the media reception buffer 209 outputs no signal to the control signal transmission/reception section 206.

The buffer monitoring section 208 monitors the media reception buffer 209 and prevents overflow of the buffer, and therefore when an amount of data exceeding a threshold is stored in the media reception buffer, it outputs a signal to the transmission rate decision section 207 instructing it to decide an appropriate transmission rate.

The media reception buffer 209 which is the storing means receives and stores the media data of the packet data input from the packet transmission/reception section 204 during the buffering time and starts output to the play back section 210 after the buffering is completed. Furthermore, the media reception buffer 209 continues to store media data even after play back is started and outputs the media data to be played back to the play back section 210 sequentially.

The play back section 210 plays back the image data read from the media reception buffer 209.

Figure 3:
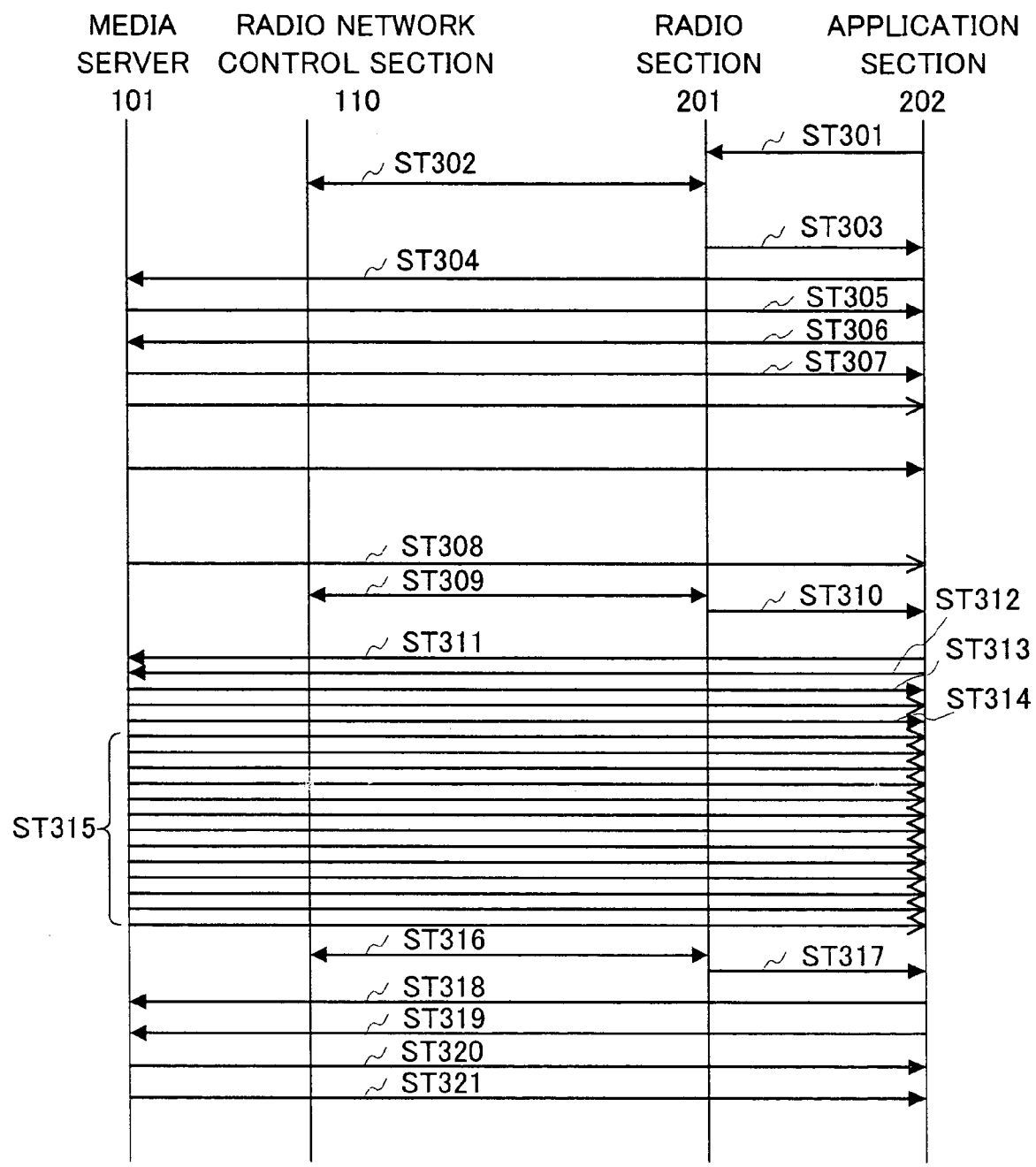
FIG. 3 illustrates an overall operation of the streaming technology according to the embodiment of the present invention.

Then, the operations of the media server 101, radio network control section 110 and mobile station apparatus 106 in the above described configuration will be explained taking a case where a maximum rate that can be set up is 384 kbps and a normal transmission rate of media (hereinafter referred to as "media-specific rate") is 128 kbps as an example using FIG. 3 and FIG. 4. FIG. 3 shows the operation of the entire streaming technology and FIG. 4 shows RTSP messages used in various steps. The steps described in FIG. 4 correspond to the steps in FIG. 3. In the explanations of the operations, the base station apparatus 105 stands between the radio transmission section 201 and radio network control section 110, and the gateway 103 and Internet 102 stand between the radio network control section 110 and the media server 101, but explanations thereof will be omitted for convenience of explanation.

When the mobile station apparatus 106 receives media data from the media server 101, it uses RTSP which is a control protocol for media distribution, but can also use any protocol other than RTSP.

First, the operation from a state in which the mobile station apparatus 106 has no media data received from the media server 101 until the mobile station apparatus 106 receives media data at a media-specific rate will be explained. The application section 202 of the mobile station apparatus 106 sends a request signal to the radio control section 205 requesting it to set up a radio channel of a maximum of 384 kbps (step (hereinafter described as "ST") 301).

When the radio control section 205 receives the request signal for a setup of 384 kbps from the application section 202, it negotiates with the radio network control section 110 through the radio transmission/reception section 203, decides the transmission bit rate with the radio situation and condition of the radio network taken into consideration and sets up a channel of 128 kbps which is a media-specific rate (ST302). Here, the media-specific rate is a rate that allows the media data to be read from the media reception buffer 209 and played back by the play back section 210. The radio control section 205 notifies the transmission rate decision section 207 that the channel of 128 kbps has been set up (ST303).

Since the media-specific rate of the media requested to be played back is 128 kbps, the application section 202 approves that the channel of 128 kbps which is sufficient for play back has been set up. When notified that the channel of 128 kbps has been set up, the application section 202 sends a signal requesting the start of a streaming session to the media server 101 through a radio transmission section 201 (ST304).

Upon receipt of the signal for the start of the streaming session, the media server 101 decides whether or not to start the session and when it decides that the session can be started, the media server 101 sends an OK signal indicating that the session has been started to the radio transmission/reception section 203 (ST305).

Then, the radio transmission/reception section 203 receives the signal indicating that the session has been started and sends the signal to the application section 202 through the radio control section 205. Upon receipt of the signal indicating that the session has been started from the radio control section 205, the application section 202 requests the media server 101 to send the media data through the radio control section 205 and radio transmission/reception section 203. In this case, the application section 202 sends a signal of NPT=0- to the media server 101 requesting it to send the media data from the start to end or until the end is indicated (ST306). When the media server 101 can respond to the transmission request from the application section 202, the media server 101 sends an OK signal indicating that transmission is possible to the application section 202 through the radio transmission section 201 (ST307). Then, the media server 101 starts transmission of the media data to the mobile station apparatus 106 through the radio transmission/reception section 203 according to an RTSP protocol and in this way a radio communication starts (ST308).

Thus, when the user moves during the radio communication and there are no more obstacles such as buildings around the mobile station apparatus, the radio environment may be improved. Furthermore, when the number of other users belonging to the same base station apparatus decreases, the radio resource may increase. In these situations, the radio network control section 110 controls the radio control section 205 so as to increase the transmission rate from the transmission rate of 128 kbps initially given at the time of channel setup to 384 kbps. Through such control, the radio network control section 110 intends to improve the efficiency of the radio resources and the number of authorized users. When such a situation occurs, the radio network control section 110 performs an operation called "bearer renegotiation" of negotiating with the radio control section 205 that the transmission rate should be increased to 384 kbps which is a maximum speed that can be set up during a communication (ST309).

Then, the radio control section 205 sends a signal indicating that the transmission rate has been increased to 384 kbps to the transmission rate decision section 207 (ST310). Then, learning that the rate has been increased to 384 kbps, the transmission rate decision section 207 outputs PAUSE which is a control command requesting a pause of transmission of media data from the media server 101 to the control signal transmission/reception section 206 and the control signal transmission/reception section 206 sends it to the radio network control section 110 through the packet transmission/reception section 204 and radio transmission/reception section 203 and the radio network control section 110 requests the media server 101 to pause the transmission of the media data (ST311). Then, the transmission rate decision section 207 calculates the speed to be requested to the media server 101 at which the data can be received, and since the calculation result is a triple rate, the transmission rate decision section 207 outputs PLAY Speed 3.0 which is a control command requesting the transmission of data at a triple rate to the control signal transmission/reception section 206 and the control signal transmission/reception section 206 sends it to the radio network control section 110 through the packet transmission/reception section 204 and radio transmission/reception section 203 and the radio network control section 110 requests the media server 101 to send data at a triple rate (ST312). Then, the media server 101 which has received the request for a pause of the transmission of the media data in ST311 sends an OK signal indicating its approval (ST313). Then, the media server 101 which has received the request for sending data at a triple rate in ST312 sends an OK signal indicating its approval of sending the data a triple rate to the application section 202 through the radio transmission/reception section 203 and radio control section 205 (ST314) and the media server 101 changes the data transmission rate from ×1 rate which is the media-specific rate to a triple rate and continues to send the media data to the mobile station apparatus 106 (ST315). PAUSE and PLAY Speed 3.0 are transmitted continuously, and therefore the period during which the distribution of the media data is interrupted is short and this has no influence on the play back of the media data at the play back section 210.

Here, the reason that the data transmission rate has been changed to the triple rate will be explained. Since the transmission rate specific to the media received from the media server 101 is 128 kbps, it is possible to transmit data at a rate of 384/128=3 on the radio channel having a transmission rate of 384 kbps. Then, when the radio channel situation deteriorates again, the radio network control section 110 performs a bearer renegotiation with the radio control section 205 through the radio transmission/reception section 203 (ST316) and the radio control section 205 sends a signal notifying that the channel transmission rate has been reduced to 128 kbps to the transmission rate decision section 207 (ST317). Then, the transmission rate decision section 207 outputs PAUSE which is a control command requesting a pause of the transmission of the media data from the media server 101 to the control signal transmission/reception section 206 and the control signal transmission/reception section 206 sends it to the radio network control section 110 through the packet transmission/reception section 204 and radio transmission/reception section 203 and the radio network control section 110 requests the media server 101 so as to pause the transmission of the media data (ST318). Then, the transmission rate decision section 207 outputs PLAY Speed 1.0 which is a control command requesting that the radio channel transmission rate should be returned to 128 kbps which is a media-specific rate of ×1 to the control signal transmission/reception section 206 and the control signal transmission/reception section 206 sends it to the radio network control section 110 through the packet transmission/ reception section 204 and radio transmission/reception section 203 and the radio network control section 110 requests the media server 101 to return the rate to the original transmission rate, that is, rate ×1 (ST319). Then, the media server 101 which has received the request for a pause of the transmission of the media data in ST318 sends an OK signal indicating its approval (ST320). Then, in ST319, the media server 101 sends an OK signal indicating its approval for the request for setting the channel transmission rate to ×1 to the application section 202 through the radio transmission/reception section 203 (ST321), changes the channel transmission rate from rate ×3 to rate ×1 and continues the transmission of the media data to the mobile station apparatus 106. PAUSE and PLAY Speed 1.0 are transmitted continuously, and therefore the period during which the distribution of the media data is interrupted is short and this has no influence on the play back of the media data at the play back section 210.

Figure 5:
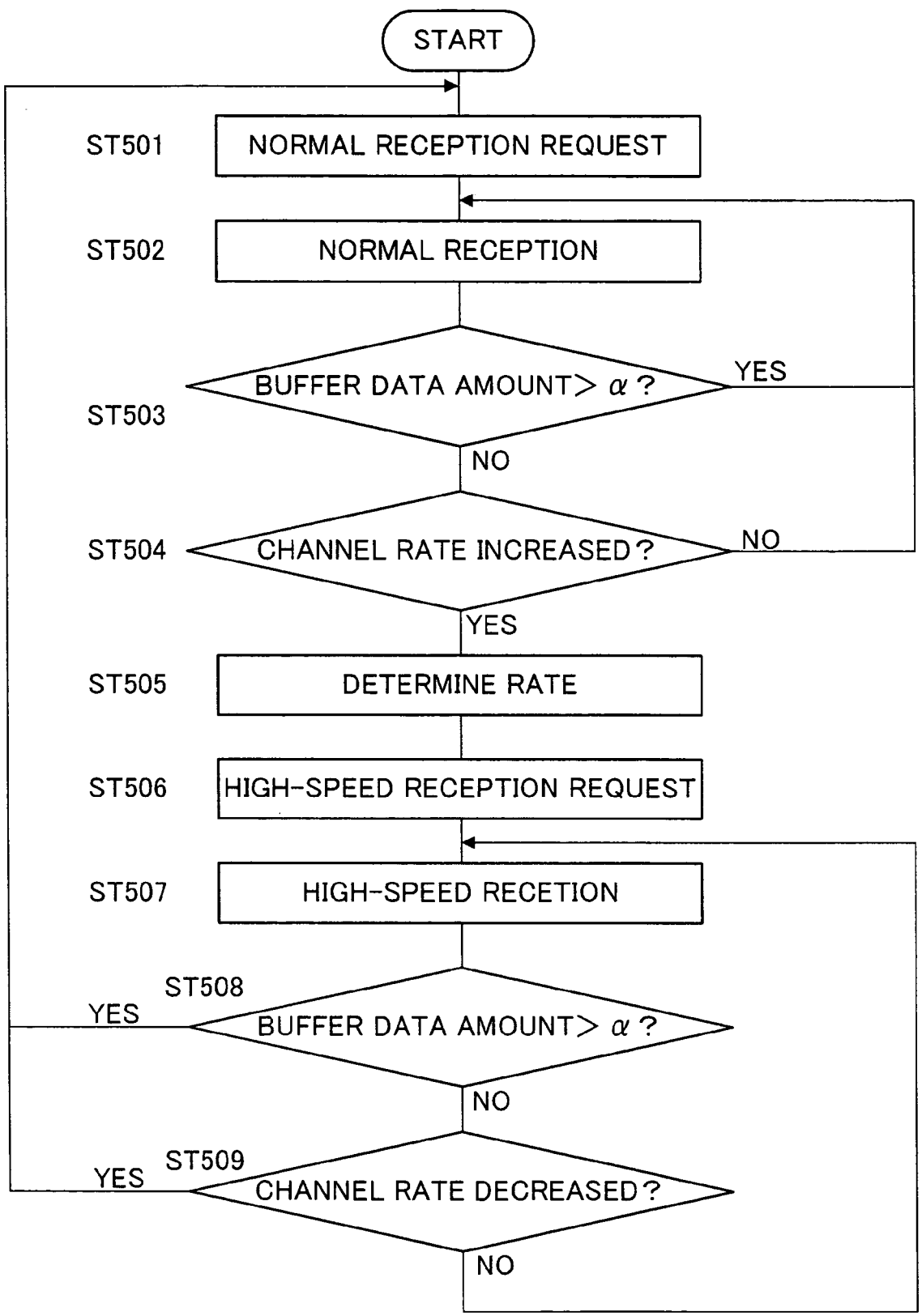
FIG. 5 illustrates a flow chart showing an operation of the mobile station apparatus according to the embodiment of the present invention.

Then, the operation of the mobile station apparatus 106 in the above described configuration will be explained using FIG. 5. FIG. 5 is a flow chart showing the operation of the mobile station apparatus 106. The application section 202 requests the media server 101 to send the media data at a normal rate (ST501). Then, when the media server 101 starts to send media data after approving the normal channel transmission rate, the mobile station apparatus 106 receives the media data (ST502). Then, the buffer monitoring section 208 monitors whether the amount of buffer data stored in the media reception buffer 209 has exceeded a threshold α or not (ST503).

When the amount of the buffer data stored exceeds the threshold α, the buffer monitoring section 208 continues reception at the transmission rate of 128 kbps and when the amount of the buffer data stored falls below the threshold α, the buffer monitoring section 208 decides whether the channel transmission rate has increased or not (ST504). When the channel transmission rate has not increased, the buffer monitoring section 208 continues to receive data at the transmission rate of 128 kbps and when the channel transmission rate has increased, the buffer monitoring section 208 decides the transmission rate at which the media data is requested to be sent from the media server 101 (ST505) and requests the radio network control section 110 to change the channel transmission rate (ST506).

The media server 101 approves the increase of the transmission rate, transmits media data at 384 kbps which is a transmission rate higher than 128 kbps and the mobile station apparatus 106 receives data at the transmission rate of 384 kbps (ST507). The buffer monitoring section 208 monitors the amount of buffer data during reception at the transmission rate of 384 kbps and when an amount of buffer data exceeding the threshold α is stored, the buffer monitoring section 208 requests the media server 101 to return the channel transmission rate to 128 kbps, returns the transmission rate to 128 kbps and continues to receive data.

On the other hand, when the amount of buffer data falls below the threshold α, reception at the transmission rate of 384 kbps is still possible, and therefore reception at the transmission rate of 384 kbps is continued (ST508). Then, the radio control section 205 decides whether the radio channel transmission rate has decreased or not and if the channel transmission rate has not decreased, the radio control section 205 continues reception at the transmission rate of 384 kbps and when the channel transmission rate has decreased, the radio control section 205 sends a request to the media server 101 requesting it to return the transmission rate to 128 kbps, returns the transmission rate to 128 kbps and continues reception (ST509).

Figure 6:
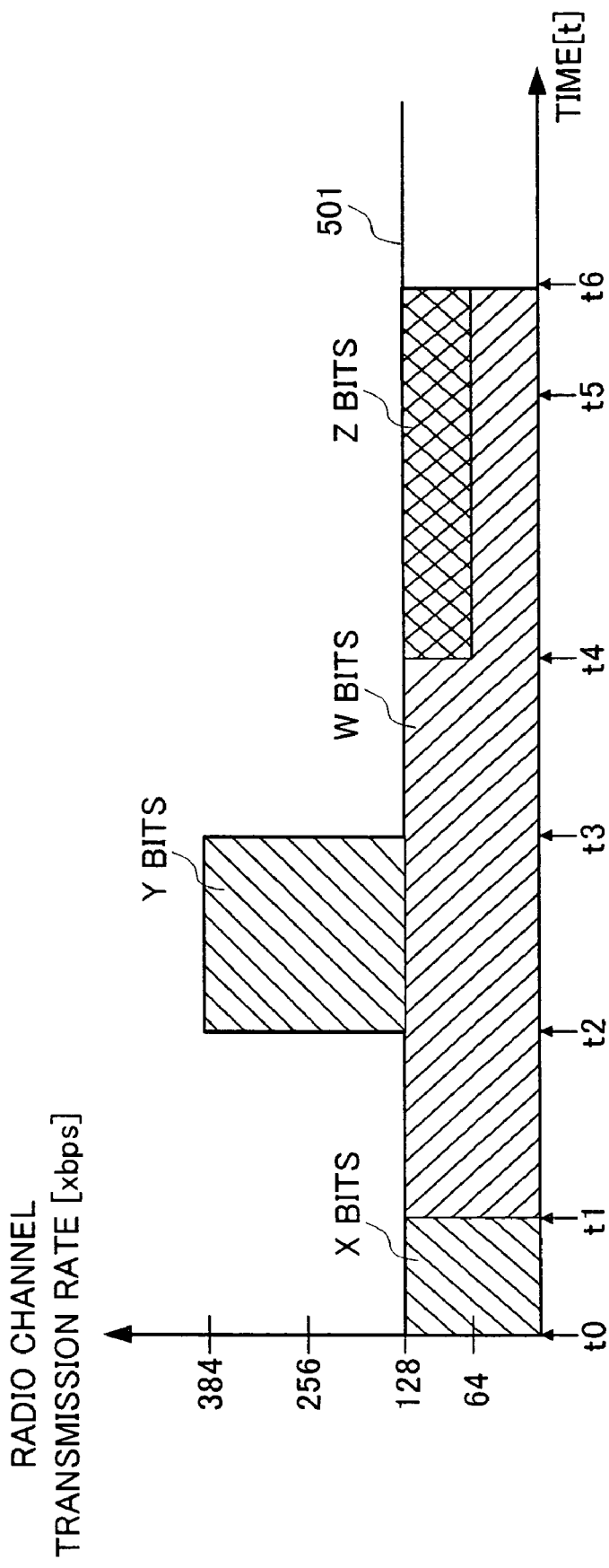
FIG. 6 illustrates a relationship between a radio channel transmission rate, time and an amount of data storage according to the embodiment of the present invention.

Then, the relationship between a variation of the radio channel transmission rate and a re-buffering period will be explained using FIG. 6. The horizontal axis shows a time (sec) and the vertical axis shows a radio channel transmission rate (kbps). At time t0, the mobile station apparatus 106 starts to receive media data from the media server 101. At time t1, the amount of data in the media reception buffer 209 reaches x bits which is the number of bits with which play back is started and play back of media is started. From time t1 at which play back of media is started onward, media data is read from the media reception buffer 209 at a constant speed of 128 kbps, and therefore when the reception rate of the media data is 128 kbps, the media data stored in the media reception buffer 209 never decreases. On the other hand, when the reception rate of the media data is less than 128 kbps, the media data stored in the media reception buffer 209 decreases.

From time t0 to time t2, the radio channel transmission rate 601 is fixed at 128 kbps which is the same as the rate at which the media data is read from the media reception buffer 209, and therefore the amount of media data stored in the media reception buffer 209 remains fixed at x bits. At time t2, the radio control section 205 informs the transmission rate decision section 207 that the radio channel transmission rate will be increased to 384 kbps.

The transmission rate decision section 207 confirms that the media reception buffer 209 is empty and sends an RTSP control command requesting that the transmission rate should be changed to a triple rate to the media server 101 through the control signal transmission/reception section 206 and radio transmission/reception section 203. In this case, the radio channel transmission rate has been increased to 384 kbps and the media-specific transmission rate is 128 kbps, and therefore the transmission rate to be requested is calculated as 384/128 kbps=3. Therefore, media data can be received at a triple rate from time t2 on, and therefore data with additional y bits can be stored in the media reception buffer 209 from time t2 to time t3 during which the radio channel transmission rate 601 is 384 kbps and the amount of media data stored in the media reception buffer 209 exceeds x bits. Then, at time t3, the radio control section 205 notifies the transmission rate decision section 207 that the radio channel transmission rate has been returned to 128 kbps.

Then, the transmission rate decision section 207 immediately requests the media server 101 through the control signal transmission/reception section 206 and radio transmission/reception section 203 to return the transmission rate to 128 kbps. From time t3 to time t4, the radio channel transmission rate 601 is 128 kbps which is the same as the rate at which media data is read from the media reception buffer 209, but because there are y bits stored in the period from time t2 to time t3, the amount of media data stored in the media reception buffer 209 from time t3 to time t4 exceeds x bits.

At time t4, the radio control section 205 notifies the transmission rate decision section 207 that the radio environment has further deteriorated and the radio channel transmission rate has fallen to 64 kbps. In this case, since the radio channel transmission rate of 64 kbps is smaller than the rate of 128 kbps at which media data is read, the media data stored in the media reception buffer 209 decreases and all the data of x bits is consumed at time t5. However, because y bits were stored in the media reception buffer 209 from time t2 to time t3, it is possible to continue to play back media. From time t4 to time t6, the radio channel transmission rate 601 is 64 kbps and the radio channel transmission rate 501 returns to original 128 kbps at time t6. After all, from time t4 to time t6, the radio channel transmission rate is lower than the rate at which the media data is read from the media reception buffer 209, and therefore the amount of media data stored in the media reception buffer 209 falls z bits short. However, since the shortfall of z bits is greater than x bits and smaller than (x+y) bits, play back of media is not interrupted due to the shortfall of media data and remains uninterrupted until all the (x+y) bits are consumed.

From time t0 to time t6, the total number of bits of the media data stored in the media reception buffer 209 is (x+y+w) bits. Furthermore, when the radio channel transmission rate also becomes 128 kbps or above from time t7 on, the media data is stored in the media reception buffer 209 at a rate of 128 kbps or above.

Thus, according to the radio apparatus of this embodiment, the radio transmission section 201 monitors the radio channel transmission rate and when the radio channel transmission rate exceeds the media-specific rate, the radio transmission section 201 notifies it to the application section 202, the application section 202 requests the radio channel control section 111 to increase the channel transmission rate so that more media data is stored in the media reception buffer 209 while the channel transmission rate is well within the capacity, and therefore even if the channel transmission rate falls short of the media-specific rate, it is possible to prevent the media reception buffer 209 from running short of media data and failing to play back the media data.

This embodiment has assumed that the media-specific rate is 128 kbps and the transmission rate is increased to 384 kbps when media data is received at a high rate, but in the case of the media-specific rate and high-speed reception, the rate can be arbitrarily changed according to the communication environment and the type of media. Furthermore, when it is possible to setup the radio channel transmission rate to up to 384 kbps, this embodiment assumes that the transmission rate of the media data is increased to 384 kbps, but it is also possible to set the transmission rate to any rate other than 384 kbps if it is not lower than 128 kbps and not higher than 384 kbps. Furthermore, it is also possible to use a fixed communication terminal apparatus instead of the mobile station apparatus 106. Furthermore, the above described embodiment decides the timing for returning the rate from 384 kbps to 128 kbps based on whether the amount of data stored in the media reception buffer 209 exceeds a threshold or not, but it is also possible to calculate the time during which media data can be stored in the media reception buffer 209 from the transmission rate that can be set up on the radio channel and media-specific rate and receive data at 384 kbps for the calculated time.

As described above, even if a maximum rate of the radio channel transmission rate that can be set up decreases due to deterioration of a communication environment, the present invention prevents data play back from being interrupted.

This application is based on the Japanese Patent Application No. 2002-117659 filed on Apr. 19, 2002, entire content of which is expressly incorporated by reference herein.

INDUSTRIAL APPLICABILITY

The present invention is preferably applicable to a data reception apparatus and data distribution system which receives and plays back data distributed from a server.

What is claimed is:

1. A data reception apparatus comprising:
a data reception section that receives data from a server;
a storage section that stores the data received by the data reception section;
a reading section that reads the data from the storage section;
a play back section that plays back the data read from the reading section;
a monitoring section that monitors a variation in a radio channel transmission rate comprising a maximum data transmission rate that can be set in a radio channel set up for a communicating party; and
a requesting section that, when the radio channel transmission rate is equal to or higher than a media specific rate comprising a rate at which the play back section reads data from the storage section and plays back the data, requests the server to transmit subsequent data at a rate equal to or higher than the media specific rate.

2. The data reception apparatus according to claim 1, wherein the requesting section requests the server to transmit the subsequent data at the rate equal to or higher than the media specific rate according to an amount of data stored in the storage section.

3. The data reception apparatus according to claim 1, wherein, when an amount of data stored in the storage section is smaller than a threshold and the radio channel transmission rate is equal to or higher than the rate at which the data is read from the storage section, the requesting section requests the server to transmit the subsequent data at a rate equal to or higher than the rate at which the data is read from the storage section.

4. The data reception apparatus according to claim 3, wherein the requesting section requests to the server a rate determined by dividing the radio channel transmission rate changed by the monitoring by the monitoring section, by the rate of reading the data.

5. The data reception apparatus according to claim 1, wherein, when an amount of data stored in the storage section is equal to or higher than a threshold, the requesting section requests the server to transmit the subsequent data at the same rate as the rate at which data is read from the storage section.

6. The data reception apparatus according to claim 1, wherein the requesting section requests the maximum rate of the radio channel transmission rate that can be set.

7. A communication terminal apparatus provided with a data reception apparatus, wherein the data reception apparatus comprises:
a data reception section that receives data from a server;
a storage section that stores the data received by the data reception section;
a reading section that reads the data from the storage section;
a play back section that plays back the data read from the reading section;
a monitoring section that monitors a variation in a radio channel transmission rate comprising a maximum data transmission rate that can be set in a radio channel set up for a communicating party; and
a requesting section that, when the radio channel transmission rate is equal to or higher than a media specific rate comprising a rate at which the play back section reads data from the storage section and plays back the data, requests the server to transmit subsequent data at a rate equal to or higher than the media specific rate.

8. A data distribution system comprising:
a distribution section that distributes data;
a transmission section that converts the data distributed by the distribution section to a radio signal and transmits the radio signal;
a reception section that receives the data transmitted by the transmission section;

a storage section that stores the data received by the reception section;

a reading section that reads the data stored in the storage section from the storage section;

a play back section that plays back the data read from the storage section by the reading section;

a monitoring section that monitors a variation in a radio channel transmission rate based on a notification from a notification section that notifies a variation in the radio channel transmission rate comprising a maximum data transmission rate that can set in a radio channel set up for the transmission section; and a requesting section that, when the radio channel transmission rate is equal to or higher than a media specific rate at which the play back section reads data from the storage section and plays back, requests the distribution section to transmit subsequent data at a rate equal to or higher than the media specific rate.

9. A data reception method comprising:

receiving data from a server;

storing the received data;

reading the stored data;

playing back the read data;

monitoring a variation in a radio channel transmission rate comprising a maximum data transmission rate that can be set in a radio channel setup for a communicating party; and when the radio channel transmission rate is equal to or higher than a media specific rate comprising a rate at which the stored data is read and played, requesting the server to transmit subsequent data at a rate equal to or higher than the media specific rate.

* * * * *